UNITED STATES PATENT OFFICE.

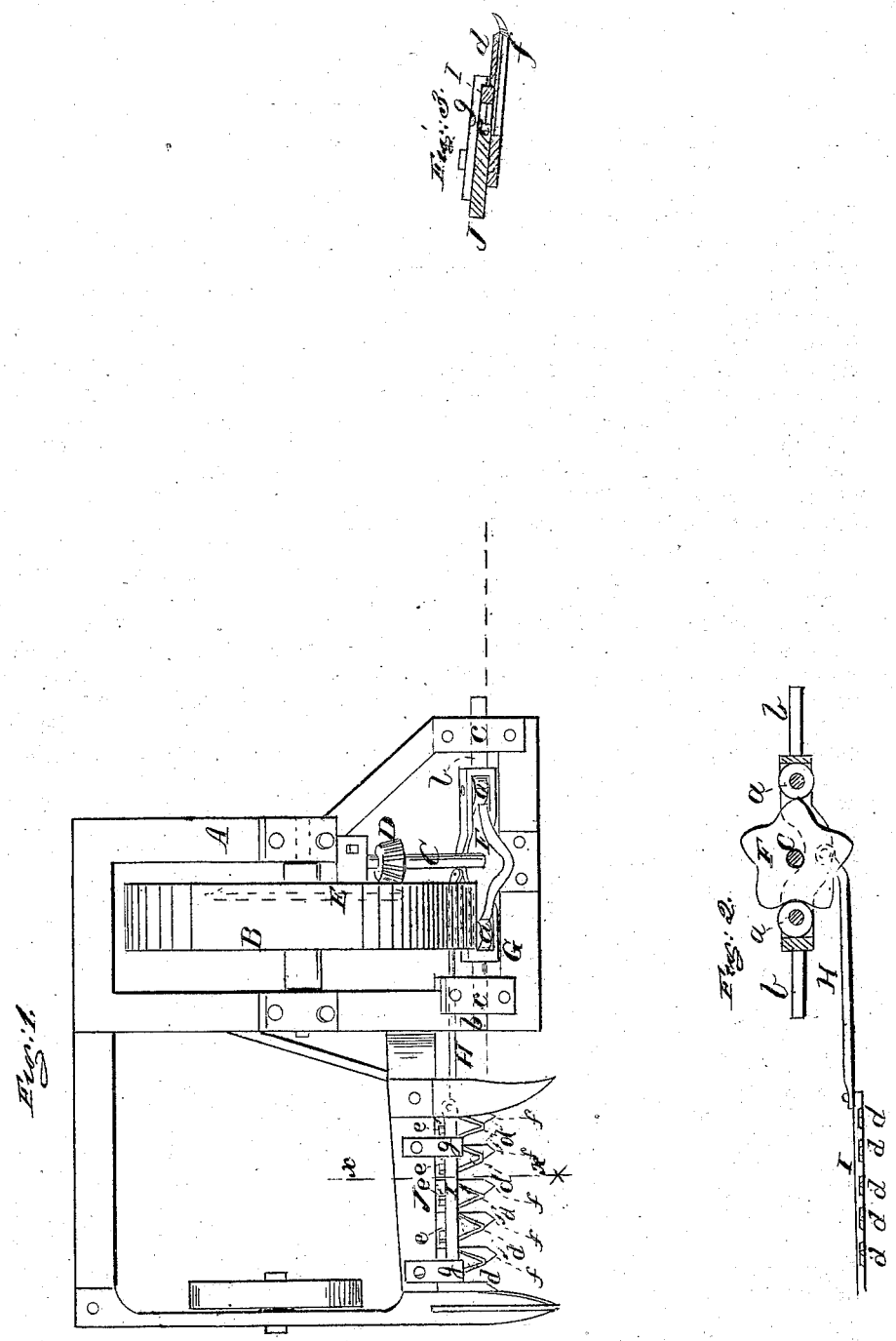

WILLIAM TINKER, OF KELLOGGSVILLE, OHIO.

IMPROVEMENT IN HARVESTERS.

Specification forming part of Letters Patent No. 15,582, dated August 19, 1856.

*To all whom it may concern:*

Be it known that I, W. TINKER, of Kelloggsville, in the county of Ashtabula and State of Ohio, have invented certain new and useful Improvements in Harvesters; and I do hereby declare that the following is a full, clear, and exact description of the same, reference being had to the annexed drawings, making a part of this specification, in which—

Figure 1 is a plan or top view of my improvement. Fig. 2 is a detached front view of the device which operates the sickle. Fig. 3 is a transverse section of the finger-bar and sickle, $x\ x$, Fig. 1, showing the place of section.

Similar letters of reference indicate corresponding parts in the several figures.

To enable those skilled in the art to fully understand and construct my invention, I will proceed to describe it.

A represents the main frame of the machine, in which the driving-wheel B is placed.

C represents a shaft, which is placed longitudinally in the main frame, and has a bevel-pinion, D, on its inner end, said pinion gearing into a bevel-wheel, E, attached to the spokes of the driving-wheel B. The outer end of the shaft C has a wiper-wheel, F, attached to it. The form of this wheel is plainly shown in Fig. 2. The wiper-wheel works between friction-rollers $a\ a$, which are fitted in a frame, G, said frame having journals or arbors $b\ b$, one at each end, which journals are fitted in bearings $c\ c$ on the main frame A, the journals being allowed to slide freely in their bearings.

To the frame G there is attached a rod, H, which is connected with the sickle-bar I. The sickle-bar I has cutters $d$ attached to it. The front parts of the cutters are of the usual saw-tooth form. The back end of the cutters extend back of the cutter-bar, and are merely short projections with parallel cutting-edges, as shown clearly at $e$, Fig. 1. The cutters $d$ work on fingers $f$, which are attached to a finger-bar, J, which is secured to the main frame A in the usual manner. The sickle-bar I works under projections $g\ g$, attached to the finger-bar, said projections serving as guides. The back ends of the projections $e$ of the cutters are close to the front edge of the finger-bar J. The projections $e$ prevent the sickle being choked by grain or grass collecting between the sickle and finger-bar, for the projections cut it immediately and keep the sickle perfectly free at all times.

As the machine is drawn along, the shaft C and wiper-wheel are rotated by the gearing D E, and the wiper-wheel, as it rotates, gives a reciprocating motion to the frame G, and consequently to the sickle-bar I, which is attached to it by the rod H.

The device for operating or driving the sickle is extremely simple, operates with but little friction, is economical to manufacture, and is not liable to get out of repair.

In the cutting and clearing action of the projections $e$ it should be observed that by the cutting-edges of such projections being parallel to each other, and at right angles to the adjoining parallel edges of the sickle and finger-bars, along the space that divides said bars, and in which said projections reciprocate, the grain or grass cut by said projections $e$ and the fingers $f$ will not be crowded against the front edge of the finger-bar J and caused to clog the space separating the finger-bar and sickle during the traverse forward of the machine, as is the case in other similar arrangements of back cutting projections of angular or tapering form, and the cutting-edges of which have not been parallel to each other nor occupied positions at right angles to the front edge of the finger-bar, but, by their different angular arrangement thereto, have served to increase the pressure of the grain or grass against the front edge of the finger-bar, which the travel forward of the machine induces, and in this way prevented the cut particles from readily passing off through the spaces which separate the fingers $f$, between the finger-bar J and sickle I; but by the cutting-edges of the back projections, $e$, arranged and operating as here shown and described, this clogging pressure of the grain or grass against the front edge of the finger-bar J is avoided, and the cut particles, as fast as cut, freely pass off through the interstices separating the fingers between the finger-bar and sickle, the jerking action or abrupt motion communicated to the said projections $e$ by the wiper-wheel F serving materially to assist the clearing action of the back projections in their place or line of travel.

I do not claim as new, irrespective of the relative arrangement of their cutting-edges to the finger-bar and their action as specified, the reciprocating back cutting projections over or through the fingers between the finger-bar and sickle; and I am also aware that the sickle has been provided with back scraping projections, presenting parallel sides or edges and moving crosswise to the traverse of the machine on or over the plain surface of the sickle-bar. Such, therefore, I do not claim; but What I do claim herein as new and useful is—

Forming the cutting-teeth $d$ with narrow back projections, $e$, having cutting-edges parallel to each other along the sides of each projection, so as to cut at right angles to the face of the finger-bar when said projections are arranged for operation over the fingers between the finger-bar and sickle, as specified, in combination with the wiper-wheel driving appliance for giving an abrupt action to said cutters for the better clearance from grain or grass of the space which separates the finger-bar and sickle, as set forth.

In testimony whereof I have hereunto subscribed my name.

WM. TINKER.

Witnesses:
  H. B. WOODBURY,
  CHAUNCEY TINKER.